United States Patent
Shteinberg et al.

(10) Patent No.: US 7,260,942 B2
(45) Date of Patent: Aug. 28, 2007

(54) METHOD OF SEALING JOINTS OF PIPELINES AND CONTAINERS OPERATING WITH CRYOGENIC FLUIDS

(76) Inventors: Alexander Shteinberg, 61 Fairlawn Dr., Berkeley, CA (US) 94708; Alexander Berlin, 24 Donskaya Street #68, Moscow 115419 (RU)

( * ) Notice: Subject to any disclaimer, the term of this patent is extended or adjusted under 35 U.S.C. 154(b) by 437 days.

(21) Appl. No.: 11/065,987

(22) Filed: Feb. 28, 2005

(65) Prior Publication Data

US 2006/0066057 A1     Mar. 30, 2006

(30) Foreign Application Priority Data

Sep. 27, 2004   (RU)  .............................. 2004128642

(51) Int. Cl.
  F17C 13/00   (2006.01)
  F16L 17/00   (2006.01)
  F16L 21/02   (2006.01)
  F16L 5/02    (2006.01)

(52) U.S. Cl. ...................... 62/50.7; 277/314; 277/602; 277/605

(58) Field of Classification Search ................ 62/50.7; 277/314, 602, 605

See application file for complete search history.

(56) References Cited

U.S. PATENT DOCUMENTS 3,549,789 A * 12/1970 Haroldson .............. 174/122 R
3,917,285 A * 11/1975 Swanson et al. ............. 277/314
5,580,068 A * 12/1996 Gundy ........................ 277/605
5,814,387 A *  9/1998 Orihara et al. ................ 428/63
5,852,938 A * 12/1998 Fuhr et al. ..................... 62/129
6,148,619 A * 11/2000 Evans ............................ 62/66
6,649,280 B1* 11/2003 Scudiere et al. ............. 428/632
2004/0025520 A1*  2/2004 Robbie ........................ 62/50.7
2004/0104535 A1*  6/2004 Easter ........................ 277/316

FOREIGN PATENT DOCUMENTS

RU    2137023    9/1999
RU    2145687    2/2000
RU    2163917    3/2001
RU    2170751    7/2001
RU    2194734   12/2002
RU    2227240    4/2004
RU    2229417    5/2004

* cited by examiner

Primary Examiner—William C Doerrler

(57) ABSTRACT

The invention relates to methods of sealing of pipeline joints operating with cryogenic liquids. The method is realized with the use of a tape of a porous structuring material that may be dry or impregnated with a liquid having a freezing point above the temperature of a cryogenic fluid in the pipeline. The material of the tape and the impregnating liquid are inert to the cryogenic fluid and to the environment. The method consists in that prior to filling the pipeline with the cryogenic fluid, the tape is tightly wrapped around the joint or an area that is at risk of a damage or puncture, the wrapping is then wetted by pouring on it the same liquid that was used for impregnation, and then the cryogenic fluid is fed to the pipeline for freezing the liquid that is contained in the tape for forming a tight frozen seal around the joint.

20 Claims, No Drawings

US 7,260,942 B2

METHOD OF SEALING JOINTS OF PIPELINES AND CONTAINERS OPERATING WITH CRYOGENIC FLUIDS

CROSS-REFERENCE TO RELATED APPLICATIONS

Not Applicable

BACKGROUND OF THE INVENTION (1) Field of the Invention

The present invention relates to a cryogenic technique and, more particularly, to a method for sealing joints of pipeline and containers operating with cryogenic fluids at extremely low temperatures. The invention may find application in aerospace, aircraft, nuclear equipment, ship building, and other industries.

(2) Description of Related Art

Basic connections used in containers for storing or in pipelines for transporting cryogenic fluids are flange joints. Improvements of reliability in flange joints of aforementioned containers and pipelines is a matter of great importance that nowadays attracts attention of scientists and designers.

Two lines of work are in progress: improvement of sealing units is attained either due to special features of the flange joint designs (RU 2145687, F16L 23/00, F16L 19/00, F16L 21/00, published Feb. 20, 2000; RU 2137023, F17C 13/00, published Sep. 10, 1999; Application RU 92011930, F16L 19/02, published Aug. 27, 1995) or due to the use of new sealants put on the internal surface of flanges (RU 2227240, F16L 15/04, published Apr. 20, 2004; RU 2170751, C09K 3/10, C09K 21/02, published Jul. 20, 2001; RU 2163917, C09K 3/10, F16L 15/04, published Mar. 10, 2001; RU 2194734, C09K 3/10, published Dec. 20, 2002).

Common disadvantages of the above methods of sealing are their complexity, high cost, and inefficiency of application for pipelines operating with cryogenic products.

In accordance with a conventional practice, all aforementioned flange joints are normally assembled and tightened, including tightening with the use of threaded fasteners, prior to loading of the container or pipeline with a cryogenic fluid, i.e., at ambient temperature. However, even at the very initial stage of use, i.e., when the container or pipeline is filled with a cryogenic fluid, seals may be subject to a failure due to mechanical stress resulting from sharp cooling of connection flanges. Such failure may be accompanied by a strong leakage and evaporation of cryogenic liquids (it is visually observed in air: the joints begin to "smoke"). Taking into account the fact that at cryogenic temperatures metals loose their plasticity, it is impossible to eliminate the leakage by additionally tightening the flange bolts, since overtightening may cause brittle fracture. Furthermore, at cryogenic temperatures the presence of sealants in interthread spaces of the flanges may only adds to the complexity of the situation.

One known method of sealing used for repairing containers for fluids consists of applying a sealing gasket or patch on the surface to be repaired. The patch is comprised of alternating layers of a reinforcing material impregnated with a polymerizable binder and a foamed plastic, the pores of which are filled with a curing agent. After the curing agent is displaced from the pores onto the binder, the patch is pressed against the surface to be repaired (see RU Patent Application 95116511, C09K 3/10, C09J 5/00, F16L 55/175, published Sep. 27, 1997).

It should be noted that in addition to such drawbacks as complexity, unreliability, inapplicability for sealing flange joints of intricate geometrical configurations, the patch-application method is absolutely unsuitable for use in pipelines that transport cryogenic fluids. RU Patent 2229417, B63B 43/16 published May 27, 2004 discloses a method of sealing punctured containers such as punctured oil tanks and pipelines that are maintained under live pressure. The method is intended for rescue works on river and sea vessels. The method is based on forming an ice sealant between the hull of the damaged vessel over the entire periphery of the hole and a <<patch>> applied onto the hole. The <<patch>> is comprised of a rigid casing with a system of tubular heat exchangers on the periphery. A cryogen (preferably, liquefied nitrogen) that flows through heat-exchanging tubes produces a cooling effect that forms ice in the areas of contact between the hull and the "patch" whereby the <<patch>> is frozen on the surface of the hull around the punctured area.

Although the aforementioned method is attractive due to its safety, it is still complicated and unreliable. Furthermore, the method is applicable only to patching holes on simple flat or curved surfaces but is inapplicable for sealing leakages through gaps and holes in bodies of complex geometrical configuration, such as, e.g., flanged joints of cryogenic pipelines widely used in aerospace industry.

It is understood that continued leakage of the cryogenic fluid may cause explosion or fire.

SUMMARY OF THE INVENTION

It is an object of the present invention to provide a method for sealing pipeline joints operating with cryogenic fluids that is simple in use, ensures reliable sealing, and is applicable to flanged joints of any geometrical configuration. The method is suitable for sealing joints and critical areas of containers and pipelines that store and transport cryogenic fluids of many types.

The method is realized with the use of a tape of a porous structuring material that may be dry or impregnated with a liquid having a freezing point above the temperature of a cryogenic fluid in the pipeline. The material of the tape and the impregnating liquid are inert to the cryogenic fluid and to the environment. The method consists in that prior to filling the pipeline with the cryogenic fluid, the tape is tightly wrapped around the joint or an area that is at risk of a damage or puncture, the wrapping is then wetted by pouring on it the same liquid that was used for impregnation, and then the cryogenic fluid is fed to the pipeline for freezing the liquid that is contained in the tape for forming a tight frozen seal around the joint.

DETAILED DESCRIPTION OF THE INVENTION

In developing stage of the method of the invention, the applicants' attention was focused mainly on reliability of sealing and the absolute fire and explosion safety. Therefore, special tests were carried out for studying behavior of different materials and liquids subject to freezing at cryogenic temperatures with formation of ice.

One can assume that a cotton fabric, which is soft and is readily available, may be a good example of a structuring material suitable for the purposes of the present invention. However, the test results showed that when a frozen seal produced by the method of the invention from a cotton fabric bandage wetted with water is used for sealing pipelines that transmit liquefied oxygen, the inevitable combination of oxygen with organic compounds of cotton leads to formation of so-called oxyliquates that are dangerously explosive and highly sensitive to impacts. In view of the above, the use of structuring materials that contain organic substances is not recommended.

The applicants have found that the method of the invention can be most efficiently realized with a structuring material in the form of a commercial glass fabric wetted with water. This material is inert to most cryogenic liquids and environments, and at the same time is soft and readily available. Glass fabric is produced from silica, which is inert to oxygen and even to the most reactive cryogens and therefore possesses high fire- and explosion-proof properties Mechanical strength of the sealing unit may be increased by making the structuring material of the tape from wire gauze in combination with water. It has been found that such a structuring material as a wire gauze made from a thin stainless-steel wire (stainless steel is a highly chemically inert material) is most suitable for freeze-sealing of liquid metals, or their alloys or amalgams. Just for reference, it should be noted that such metal as gallium has a freezing point of +30° C., i.e., may freeze at room temperature. The glass fabric tape can also be used for such applications, but is not recommended since it is inferior to the wire gauze in strength of the obtained frozen seal. It is that based on gallium amalgams have high performance characteristics (see "Thermostable Adhesives" by A. P. Petrova, (Khimiya, Moscow, 1977), Chapter "Metallic Adhesives").

In forming frozen seals of the invention, both glass fabric and wire gauze showed equally good properties as structuring materials for cryogens with freezing points ranged from −40 to +26° C.

The method of the invention is carried out as follows.

Prior to loading a cryogenic fluid into a container or a pipeline, all joints or connections are tightly wrapped with a tape of a porous structuring material. As has been mentioned above, the tape can be made, e.g., from glass fabric or may be comprised of a fine but dense metal wire gauze. The tape can be preliminarily wetted with a liquid that is intended for forming a frozen seal. In order to ensure reliable contact of the liquid with the areas that may be vulnerable to the formation of cracks during filling of the container or pipeline with the cryogenic fluid, the wound tape is impregnated, preferably, to complete saturation, by pouring it with the same liquid that was used for wetting.

After the wrapped areas are checked with regard to the degree of saturation, the container or a pipeline is filled with the cryogenic fluid, whereby the liquid contained in the structuring material freezes and thus forms a dense icy seal around the joints or other critical areas of the container or pipeline. As has been mentioned above, structuring materials and impregnating liquids should be inert to the cryogenic fluids and the surrounding environment.

The method of the invention will be further described with reference to practical examples that are given only for illustrative purposes and should not be construed as limiting the scope of the application of the invention.

EXAMPLE 1

A tape made from a commercial glass fabric was washed with acetone or cryogen to remove traces of organic oils and dried. All butts or joints of a pipeline were wrapped with a dry tape, except one used for reference. Water was then poured onto the wound tape for wetting till the entire wrapping was impregnated to a sufficient degree. The pipeline was filled with liquid oxygen. The supply of liquid oxygen to the pipeline caused water contained in the tape to freeze. Upon completion of freezing, all joints were coated with a frozen tape that formed tight seals around the connection areas. Reliability of the frozen seal was confirmed by the fact that no mist was observed during 24 hours in the sealed areas while a "mist" caused by leakage of oxygen was observed around non-sealed joints.

EXAMPLE 2

The method was carried out similar to the one described in Example 1, with the exception that after being washed and dried, prior to wrapping around the joint areas the tape of a commercial glass fabric was immersed in water for several minutes. Observation during 24 hours did not reveal any oxygen leakage.

EXAMPLE 3

A tape made from filtering gauze of fine stainless steel wire was immersed in water for several minutes. All joints of a test pipeline, except one used for reference, were then wrapped with the wet tape. Water was poured onto the wrapped joint till complete impregnation of the wound tape. The pipeline was filled with liquid hydrogen. Reliability of the frozen seal was confirmed by the fact that no mist was observed during 24 hours in the sealed areas while non-sealed joints were constantly <<smoking>>.

EXAMPLE 4

All pipeline joints, except for one used for reference, were wrapped with a dry tape made from filtering gauze of fine stainless steel wire. The wrapped tape was thoroughly wetted till complete saturation by pouring onto it liquid gallium. Then liquid ethane was fed into the pipeline. As the pipeline was filled with liquid ethane, liquid gallium contained in the tape froze. Reliability of the frozen seal was confirmed by the fact that no mist was observed during 24 hours in the sealed areas while non-sealed joints were constantly <<smoking>>.

EXAMPLE 5

A tape made from filtering gauze of fine stainless steel wire was immersed for several minutes in Cryogen 113 (trifluorotrichloroethane of formula $CFCl_2CF_2Cl$, melting point −36.6° C.). All joints of the pipeline, except one used for reference, were wrapped with the aforementioned tape impregnated with Cryogen 113. The wrapped tape was thoroughly wetted till complete saturation by pouring onto it Cryogen 113. Then liquid hydrogen was fed into the pipeline. As the pipeline was filled with liquid hydrogen, the cryogen contained in the tape froze. Reliability of the frozen seal was confirmed by the fact that no mist was observed during 24 hours in the sealed areas while non-sealed joints were constantly <<smoking>>.

EXAMPLE 6

A tape of a commercial glass fabric was washed with acetone or cryogen for removing traces of organic oils. The washed tape was dried. All joints of a pipeline, except one used for reference, were wrapped with the dried tape. The wrapped tape was thoroughly wetted till complete saturation by pouring onto it Cryogen 112 (difluorotetra-chloroethane of formula $CFCl_2CFCl_2$, melting point $+26°$ C.). Then liquid ethane was fed into the pipeline. As the pipeline was filled with liquid hydrocarbon, the cryogen contained in the tape froze. Reliability of the frozen seal was confirmed by the fact that no mist was observed during 24 hours in the sealed areas while non-sealed joints were constantly <<smoking>>.

Thus, it has been shown that the invention provides a method for sealing pipeline joints operating with cryogenic fluids that is simple in use, ensures reliable sealing, and is applicable to flanged joints of any geometrical configuration. The method is applicable for sealing joints and critical areas of containers and pipelines that store and transport cryogenic fluids of many different types.

While the invention has been described with reference to specific embodiments, the description is illustrative of the invention and is not to be considered as limiting the invention. Various modifications and applications may occur to those skilled in the art without departing from the true spirit and scope of the invention. For example, the cryogenic fluid is not necessarily a liquid and may be comprised of a gaseous medium. The tapes can be made from porous soft materials other than those mentioned in the specification. Although joints were mentioned in the specification as objects of sealing, the method is applicable for sealing any selected places of the pipeline or container, e.g., flanged connections, welding seams, worn walls, patched areas, zones subject to deterioration by corrosion, portions of the pipelines passing through explosively dangerous premises, or production zones with explosive environment, etc. Therefore, the term <<joint>> used in the claims should be construed in a broader meaning to cover other critical areas of the pipeline or container.

What we claim is:

1. A method for sealing critical areas of a container or pipeline operating with a cryogenic fluid, the method comprising the steps of:
    Providing a tape of a soft porous material;
    impregnating said tape with a liquid that has a freezing point higher than the temperature of said cryogenic fluid thus producing an impregnated tape;
    wrapping said critical areas with said impregnated tape;
    filling said container or pipeline with said cryogenic fluid, thus freezing said liquid contained in said tape and forming a frozen seal around the area wrapped with said impregnated tape.

2. The method of claim 1, comprising the step of choosing the material or said tape and said liquid from those which are chemically inert to said cryogenic fluid and the environment that surrounds said container or pipeline.

3. The method of claim 2, wherein said steps of providing a tape, impregnating said tape, and wrapping said joints are carried out prior to said step of filling.

4. The method of claim 3, wherein said step of impregnating is carried out prior to said step of wrapping.

5. The method of claim 3, wherein said step of impregnating is carried out after said step of wrapping.

6. The method of claim 4, wherein after said step of wrapping, said impregnating tape is wetted for the second time till complete saturation of the material of said impregnating tape with a second liquid, which is compatible with said liquid that has been used for impregnation prior to wrapping and which is inert to said cryogenic fluid and said liquid which has been used for impregnation.

7. The method of claim 6, wherein said second liquid is the same as said liquid used for impregnation, said second liquid having a freezing point higher than the temperature of said cryogenic fluid.

8. The method of claim 1, wherein said soft porous material is selected from the group consisting of a cotton fabric, glass fabric, and filtering gauze of fine metal wire, and wherein said cryogenic fluid is selected from the group consisting of a liquefied gas and metal with high point of freezing.

9. The method of claim 2, wherein said soft porous material is selected from the group consisting of a cotton fabric, glass fabric, and filtering gauze of fine metal wire, and wherein said cryogenic fluid is selected from the group consisting of a liquefied gas and metal with high point of freezing.

10. The method of claim 3, wherein said soft porous material is selected from the group consisting of a cotton fabric, glass fabric, and filtering gauze of fine metal wire, and wherein said cryogenic fluid is selected from the group consisting of a liquefied gas and metal with high point of freezing.

11. The method of claim 4, wherein said soft porous material is selected from the group consisting of a cotton fabric, glass fabric, and filtering gauze of fine metal wire, and wherein said cryogenic fluid is selected from the group consisting of a liquefied gas and metal with high point of freezing.

12. The method of claim 5, wherein said soft porous material is selected from the group consisting of a cotton fabric, glass fabric, and filtering gauze of fine metal wire, and wherein said cryogenic fluid is selected from the group consisting of a liquefied gas and metal with high point of freezing.

13. The method of claim 8, wherein said metal with high point of freezing is gallium.

14. The method of claim 9, wherein said metal with high point of freezing is gallium.

15. The method of claim 10 wherein said metal with high point of freezing is gallium.

16. The method of claim 11, wherein said metal with high point of freezing is gallium.

17. The method of claim 12, wherein said metal with high point of freezing is gallium.

18. The method of claim 1, wherein said liquid used for impregnation is water.

19. The method of claim 2, wherein said liquid used for impregnation is water.

20. The method of claim 3, wherein said liquid used for impregnation is water.

* * * * *